United States Patent
Seo (10) Patent No.: US 7,443,446 B2
(45) Date of Patent: Oct. 28, 2008

(54) APPARATUS FOR CONTROLLING ROTATION ANGLE OF A CAMERA MODULE FOR A MOBILE COMMUNICATION DEVICE

(75) Inventor: Seong-Young Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 771 days.

(21) Appl. No.: 10/856,634

(22) Filed: May 27, 2004

(65) Prior Publication Data
US 2004/0252227 A1    Dec. 16, 2004

(30) Foreign Application Priority Data
May 30, 2003  (KR)  ............... 10-2003-0034913

(51) Int. Cl.
  *H04N 5/225*  (2006.01)
  *H04M 1/00*  (2006.01)
(52) U.S. Cl. ............... 348/375; 348/373; 348/376; 455/556.1
(58) Field of Classification Search ......... 348/373–376, 348/552; 455/556.1, 575.1; 361/600; D16/200
See application file for complete search history.

(56) References Cited

U.S. PATENT DOCUMENTS

| | | | |
|---|---|---|---|
| 5,815,759 A * | 9/1998 | Tseng et al. ............... | 396/541 |
| 6,141,052 A * | 10/2000 | Fukumitsu et al. ........... | 348/373 |
| 6,628,974 B1 * | 9/2003 | Lim ........................ | 455/575.3 |
| 6,785,935 B2 * | 9/2004 | Ahn et al. ................. | 16/221 |
| 6,836,669 B2 * | 12/2004 | Miyake et al. ........... | 455/556.1 |
| 6,904,298 B2 * | 6/2005 | Arai et al. ................ | 455/556.1 |
| 7,184,092 B2 * | 2/2007 | Lim ......................... | 348/376 |
| 2003/0066678 A1 * | 4/2003 | Hsieh ....................... | 174/254 |

FOREIGN PATENT DOCUMENTS

| | | |
|---|---|---|
| EP | 0 670 661 A2 | 9/1995 |
| EP | 1 213 924 A1 | 6/2002 |
| EP | 1 267 576 A2 | 12/2002 |

* cited by examiner

*Primary Examiner*—David Ometz
*Assistant Examiner*—Pritham Prabhakher
(74) *Attorney, Agent, or Firm*—Lee, Hong, Degerman Kang & Waimey

(57) ABSTRACT

An apparatus for controlling a rotation angle of a camera module of a mobile communication device includes: a camera module, a driving force generating means having a rotation shaft, a push member rotatably coupled to the rotation shaft, a camera rotating plate fixed to the camera module, a pivot member for connecting the push member to the camera rotating plate and serving as a pivot for the camera rotating plate, the driving force generating means driving the push member via the rotation shaft for selectively pushing the camera rotating plate to control a rotation angle of the camera module, a boss formed at the center of the camera rotating plate and having a coupling cavity at its central portion, and a projection connected to the rotation shaft of the driving force generating means so as to be inserted in the coupling cavity of the boss.

22 Claims, 9 Drawing Sheets

APPARATUS FOR CONTROLLING ROTATION ANGLE OF A CAMERA MODULE FOR A MOBILE COMMUNICATION DEVICE

CROSS-REFERENCE TO RELATED APPLICATIONS

Pursuant to 35 U.S.C. § 119(a), this application claims the benefit of earlier filing date and right of priority to Korean Application No. 2003-34913, filed on May 30, 2003, the contents of which is hereby incorporated by reference herein in their entirety:

BACKGROUND OF THE INVENTION

1. Field of the Invention

The present invention relates to a camera module of a mobile communication device, and more particularly, to an apparatus for controlling a rotation angle of a camera module of a mobile communication device.

2. Description of the Related Art

Mobile communication device is a term used to indicate devices such as mobile telephones, cellular telephones, personal communication systems (PCS), personal data assistants (PDAs), lap top computers and other devices having radio communication capabilities.

Currently, mobile communication devices provide more than just voice or data transmission functions. They also offer Internet capabilities and other multimedia functions. Additionally, mobile communication devices can be provided with a small-sized camera module for photographing an object. A device can transmit the photographed image to another mobile communication device or receive a picture therefrom. The picture can also be transmitted to an immobile communication device such as a desktop computer.

Figure 1:
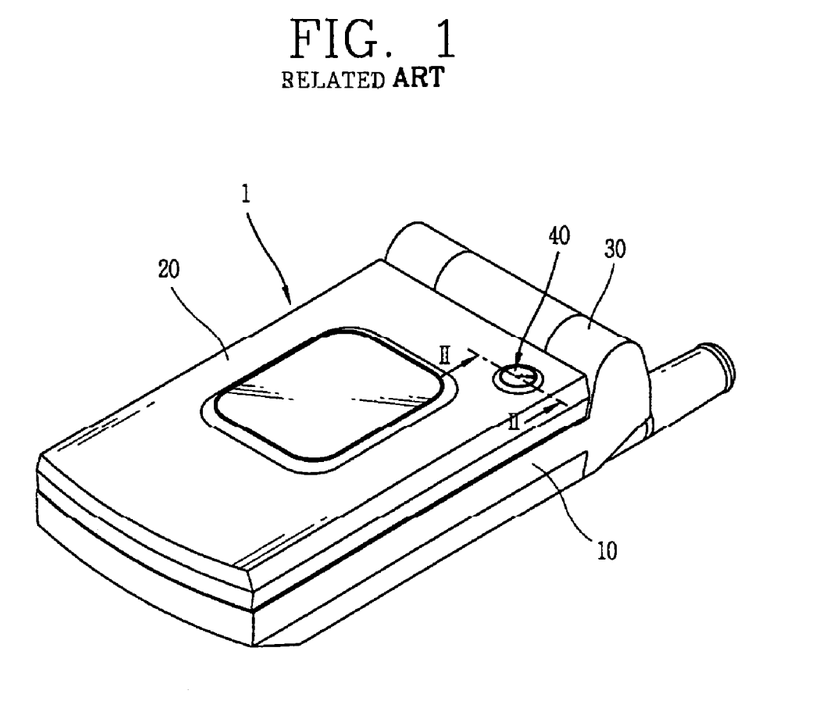
FIG. 1 is a perspective view showing a conventional mobile communication device.
Figure 2:
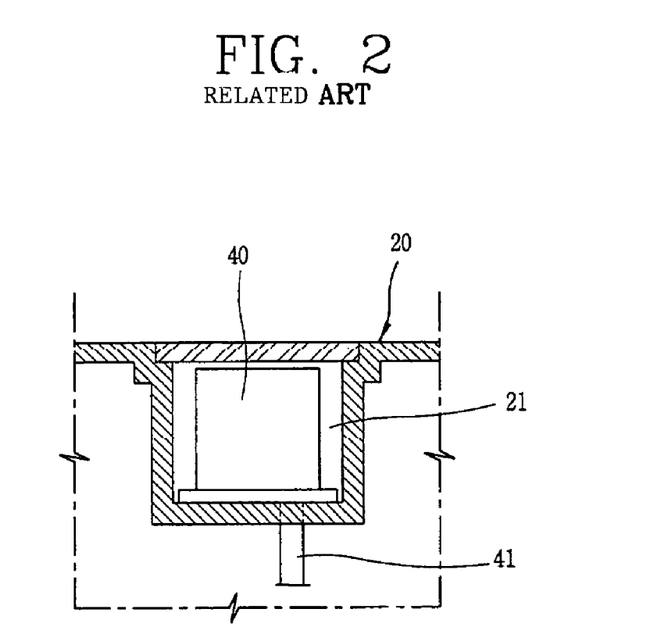
FIG. 2 is a sectional view taken along line II-II of FIG. 1.

FIG. 1 is a perspective view showing a conventional mobile communication device, and FIG. 2 is a sectional view taken along line II-II of FIG. 1.

As shown in FIG. 1, the conventional mobile communication device 1 includes a main body 10, a folder 20 rotatably installed at one side of the main body 10 by a hinge portion 30 and a camera module 40 installed at an upper surface of the folder 20.

As shown in FIG. 2, the camera module 40 is fixed in a camera-mounting cavity 21 formed at an upper surface of the folder 20. The camera module 40 is electrically connected to a main printed circuit board (not shown) of the main body 10 through a flexible print circuit board 41.

In a conventional mobile communication device as described above, the camera module 40 is fixed to a bottom surface of the camera-mounting cavity of the folder 20. For this reason, it is very difficult for a user to control a photographing angle (or rotation angle) of the camera module 40 at will.

Specifically, because the camera module 40 is fixed to the folder, a user must necessarily move the entire mobile communication device 1 in order to properly position the camera module 40 in front of the object when taking photographs. This is particularly of great inconvenience when photographing a moving object because the user must continuously move the entire device to follow the object.

SUMMARY OF THE INVENTION

The present invention provides an apparatus for controlling a rotation angle of a camera module of a mobile communication device in accordance with one embodiment. The apparatus is easily and conveniently controlled by a direction button installed at a main body of the device.

To achieve these and other advantages and in accordance with the purpose of the present invention, as embodied and broadly described herein, there is provided an apparatus for controlling a rotation angle of a camera module of a mobile communication device including a camera module, a driving force generating means having a rotation shaft, a push member rotatably coupled to the rotation shaft, a camera rotating plate configured for a camera module, and a pivot member for connecting the push member to the camera rotating plate and serving as a pivot for the camera rotating plate, wherein the driving force generating means drives the push member via the rotation shaft for selectively pushing the camera rotating plate to control a rotation angle of the camera module.

In one aspect, the pivot member includes a boss formed at a central portion of the camera rotating plate wherein a coupling cavity is formed at a central portion of the boss. The pivot member further includes a projection inserted in the coupling cavity and connected to the driving force generating means, wherein the projection is centrally positioned at point of rotation of the push member.

In another aspect, the boss is made of an elastic material so that the projection can be removably inserted in the coupling cavity. Preferably, a diameter of an entrance of the coupling cavity is smaller that a diameter of the projection. However, a diameter of a central portion of the coupling cavity is greater that a diameter of the projection.

In a further aspect, mountains and valleys are alternately formed in a circumferential direction at a surface of the camera rotating plate wherein at least one inclined surface is formed between each mountain and valley, the at least one inclined surface being selectively pushed by the push member to control the rotation angle of the camera module. Also, two inclined surfaces are positioned to face into each other forming a valley in between, each inclined surface being formed at a 45-degree angle.

In yet another aspect, the projection and the push member are formed as one body.

In yet a further aspect, the mobile communication device comprises a main body, a folder rotatably fixed to a side of the main body by a hinge portion, and a camera mounting cavity formed at an upper surface of the folder for housing the camera module, wherein the driving force generating means is electrically connected to a main printed circuit board of the main body through a flexible printed circuit board and a user-manipulated direction button is installed on the main body for the user to control the apparatus, wherein pressing the user-manipulated direction button causes movement of the rotation shaft of the driving force generating means to cause movement of the push member to cause movement of an inclined surface of the camera rotating plate to thereby control the rotation angle of the camera module.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 3:
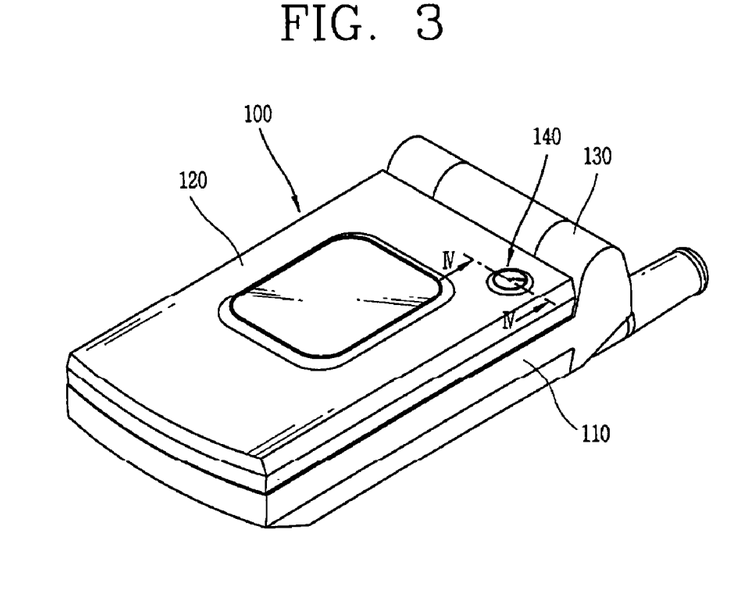
FIG. 3 is a perspective view showing a mobile communication device in accordance with one embodiment of the present invention.
Figure 4:
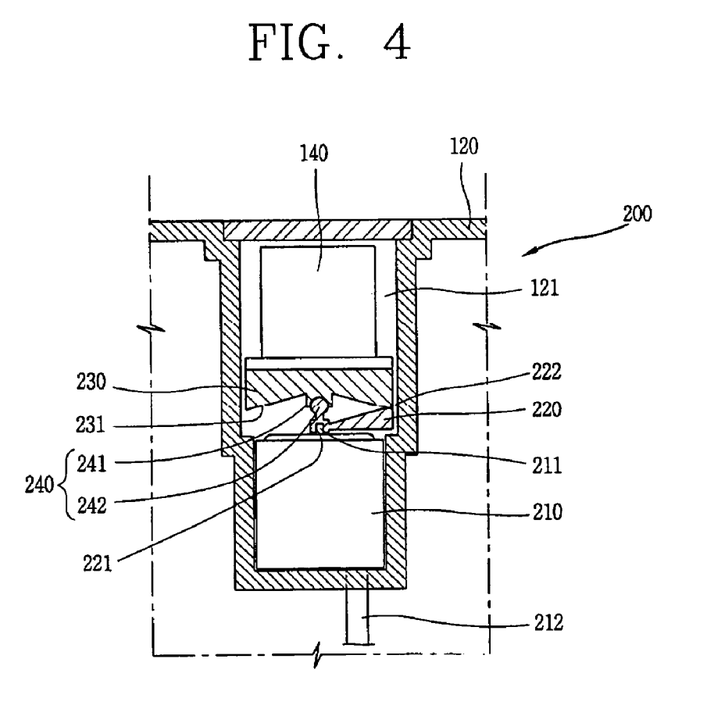
FIG. 4 is a sectional view taken along line IV-IV of FIG. 3.

As shown in FIGS. 3 and 4, a mobile communication device 100 in accordance with the present invention comprises a main body 110, a folder 120 rotatably installed at one side of the main body 110 by a hinge portion 130, and a camera module (camera assembly) 140 fixed to a camera mounting cavity 121 formed at an upper surface of the folder 120.

Referring to FIGS. 4 to 7, an apparatus 200 for controlling a rotation angle of a camera module 140 of a mobile communication device 100 in accordance with the present invention comprises a camera module 140, a driving force generating means 210 having a rotation shaft 211, a push member 220 rotatably coupled to the rotation shaft 211, a camera rotating plate 230 configured for a camera module 140, and a pivot member 240 for connecting the push member 220 to the camera rotating plate 230 and serving as a pivot for the camera rotating plate 230.

The driving force generating means 210 drives the push member 220 via the rotation shaft 211 for selectively manipulating the camera rotating plate 230 to control a rotation angle of the camera module 140. Preferably, the driving force generating means 210 is a step motor. Hereinafter, the driving force generating means 210 will be referred to as the step motor 210. It is noteworthy that other functional and structural equivalents, such as mechanical shafts or electric rotors may be employed to generate the subject driving force, in other embodiments.

Figure 5:
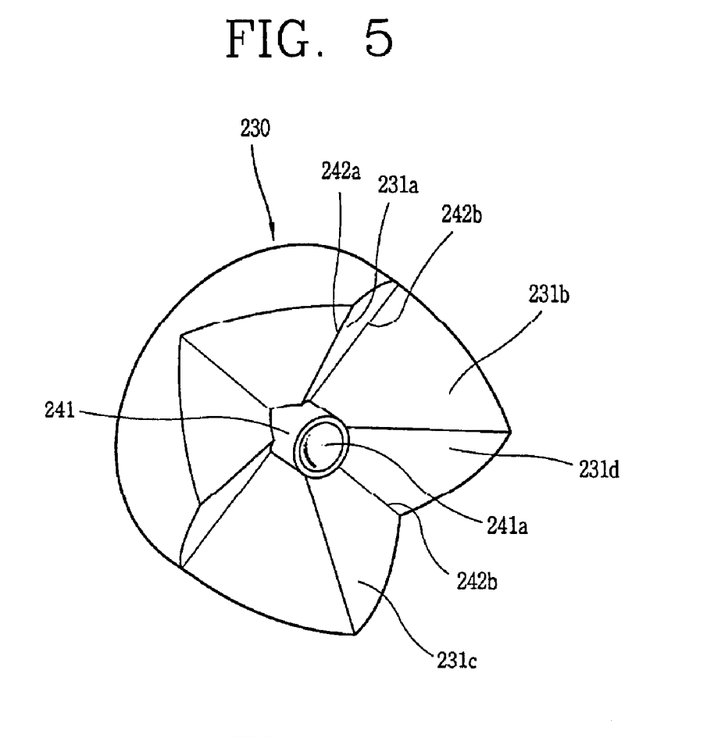
FIG. 5 is a perspective view showing a camera rotating plate in an apparatus for controlling a rotation angle of a camera module of a mobile communication device in accordance with one embodiment of the present invention.

Referring to FIGS. 4 and 5, the pivot member 240 is constructed as a ball joint comprising a boss 241 in operational relationship with a projection 242. The boss 241 is formed at a central portion of the camera rotating plate 230 wherein a coupling cavity 241a is formed at a central portion of the boss 241. The projection 242 is configured for insertion in the coupling cavity 241a and is connected to the rotation shaft 211 of the step motor 210. Preferably, the step motor 210 is electrically connected to a main printed circuit board (not shown) of the main body 110 through a flexible printed circuit board 212.

Figure 6:
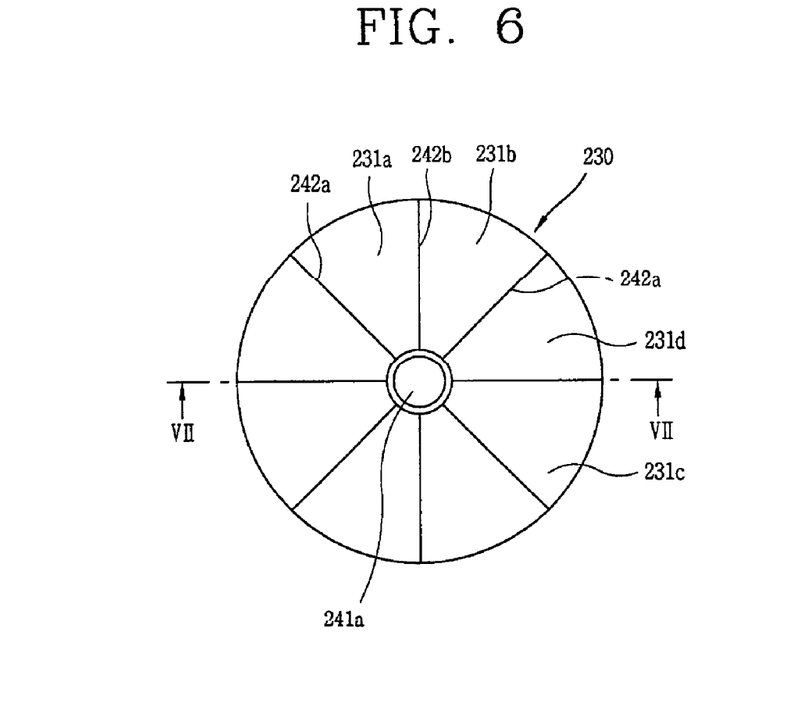
FIG. 6 is a front view showing a camera rotating plate of FIG. 5.
Figure 7:
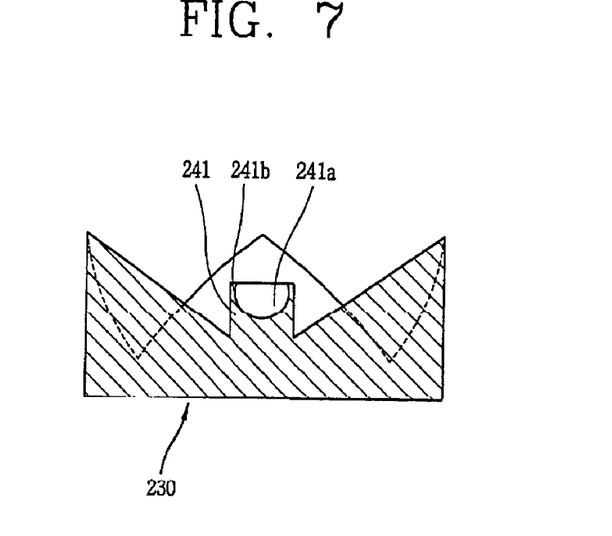
FIG. 7 is a sectional view taken along line VII-VII of FIG. 6.

Referring to FIGS. 5, 6 and 7, on at least one surface of the camera rotating plate 230, namely, a surface facing the push member 220, mountains 242a and valleys 242b are alternately formed in a circumferential direction. Between the mountains 242a and the valleys 242b, alternately opposite inclined surfaces 231a to 231d are formed. In operation, each inclined surface 231a to 231d is selectively pushed by the push member 220 to control the rotation angle of the camera module 140.

First inclined surface 231a and second inclined surface 231b face into each other with a valley 242b in between. Likewise, third inclined surface 231c and fourth inclined surface 231d face into each other with a valley 242b in between. Preferably, each inclined surface 231a, 231b, 231c and 231d is formed at a 45-degree angle, centering on the center of the camera rotating plate 230.

Figure 8:
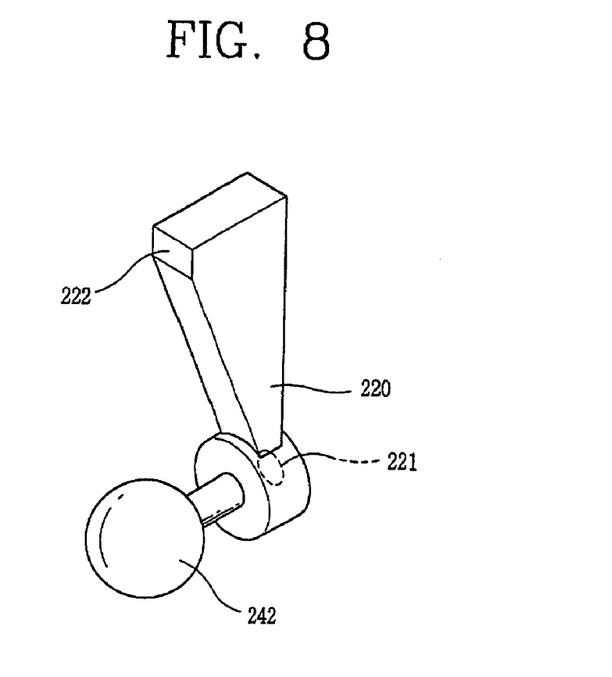
FIG. 8 is a perspective view showing a push member and a projection in an apparatus for controlling a rotation angle of a camera module of a mobile communication device in accordance with one embodiment of the present invention.

As shown in FIG. 8, the push member 220 provides for a rotation shaft coupling cavity 221 in which the rotation shaft 211 is inserted. A push surface 222 is also formed on the push member 220 for pushing the inclined surfaces 231a, 231b, 231c and 231d. Preferably, the projection 242 and the push member 220 are formed as one body to increase the strength of the structure.

Figure 9A:
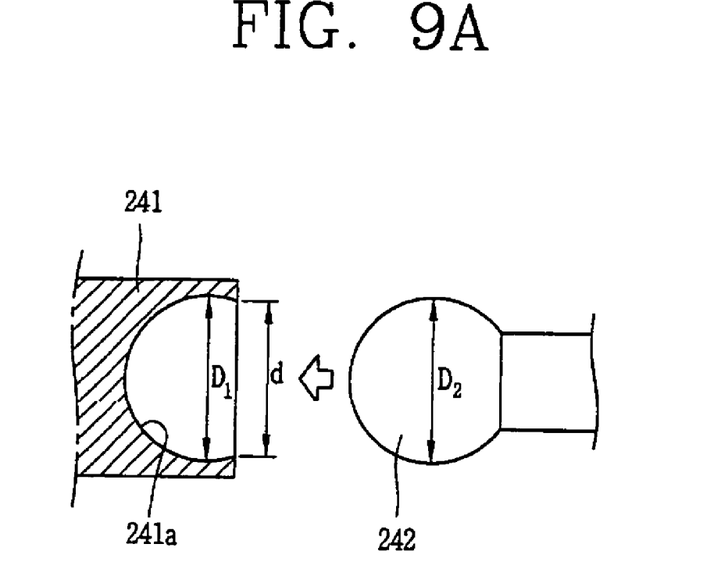
FIG. 9A is a view for describing a diameter of an entrance of a coupling cavity and a diameter of a projection in an apparatus for controlling a rotation angle of a camera module of a mobile communication device in accordance with one embodiment of the present invention.
Figure 9B:
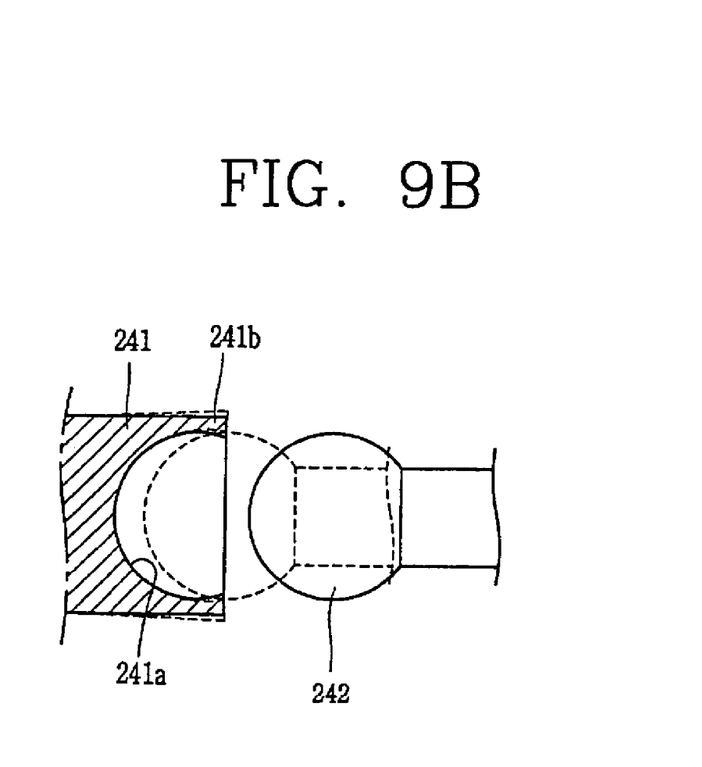
FIG. 9B is a view showing that a boss is elastically deformed just before the projection is coupled to the coupling cavity in an apparatus for controlling a rotation angle of a camera module of a mobile communication device in accordance with one embodiment of the present invention.

FIG. 9A is a view showing a diameter of an entrance of a coupling cavity 241a and a diameter of a projection 242. FIG. 9B is a view showing that a boss 241 is elastically deformed just before the projection 242 is coupled to the coupling cavity 241a.

As shown in FIG. 9A, a diameter (d) of the entrance of the coupling cavity 241a is preferably smaller than a diameter (D2) of the projection 242. In this state, the boss 241 is preferably made of an elastic material so that the projection 242 can be removably inserted in the coupling cavity 241a.

Referring to FIG. 9B, the projection 242 is placed near the entrance 241b of the coupling cavity 241a. When power is applied to the apparatus, an end of the boss 241, namely, the entrance 241b of the coupling cavity 241a is elastically deformed as shown in FIG. 9B as a dotted line. At this time, the projection 242 is inserted in the coupling cavity 241a.

Preferably, a diameter (D1) of the central portion of the coupling cavity 241a is greater than a diameter (D2) of the projection 242 to some extent. This allows rotational movement of the camera rotating plate 230, centering on the projection 242, to permit the rotating plate 230 to be selectively pushed by the push member 220 to control the rotation angle of the camera module 140.

The apparatus of the present invention is implemented to allow a user to manipulate an operation button (not shown) installed at the main body 110 to photograph an object (not shown) through the camera module 140. Once the photograph is taken, the user can then transmit the image either to another mobile communication device or an immobile communication device such as a desktop computer.

When the user wishes to change the rotation angle of the camera module 140 to photograph an object, the user manipulates a direction button (not shown) installed at the main body 110 to activate the step motor 210 and thereby drive the apparatus 200 to control the rotation angle.

Referring to FIGS. 10 to 15, an operation for controlling a rotation angle of the camera module 140 in various directions by using a rotation force of the step motor 210, will now be described.

Figure 10:
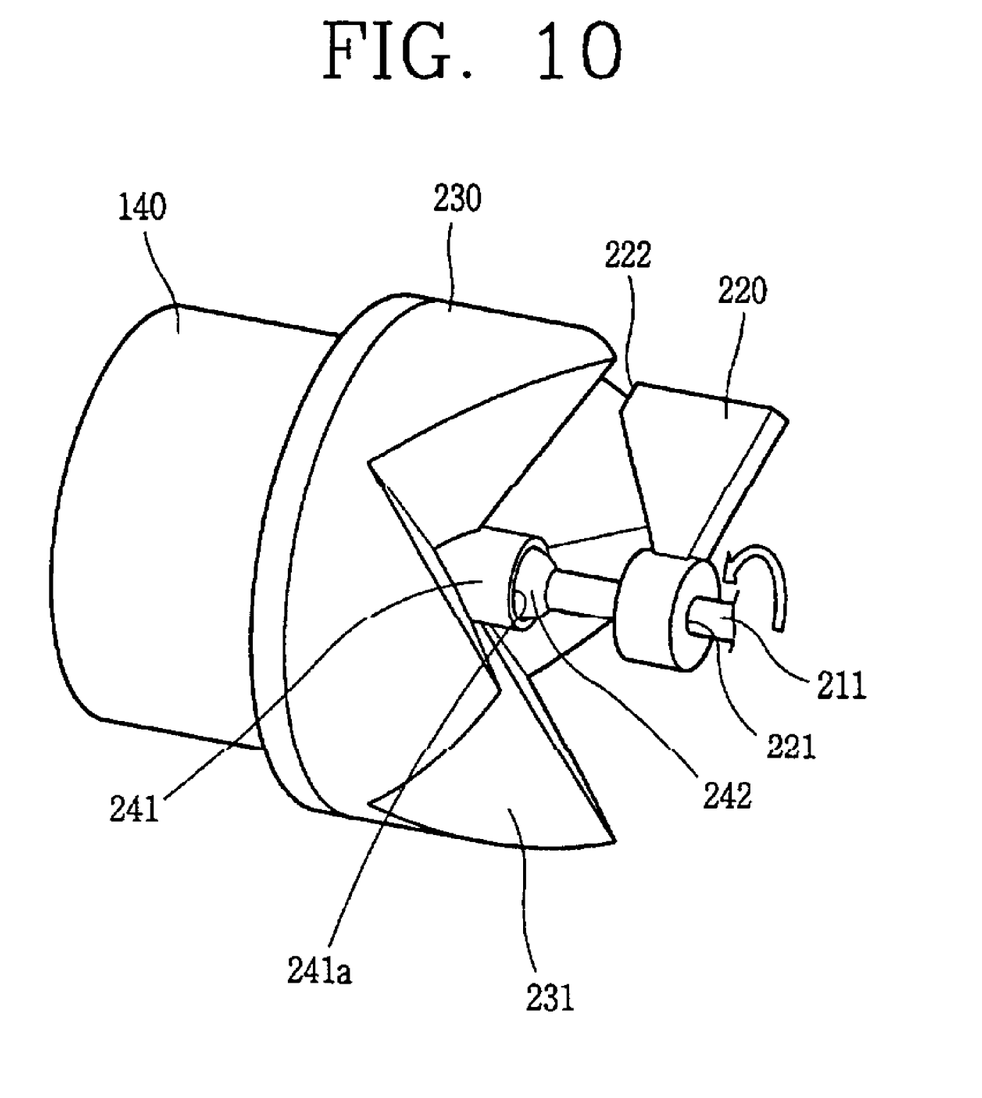
FIG. 10 is a perspective view showing a camera module at a center line of a camera rotating plate in an apparatus for controlling a rotation angle of a camera module of a mobile communication device in accordance with one embodiment of the present invention.
Figure 11:
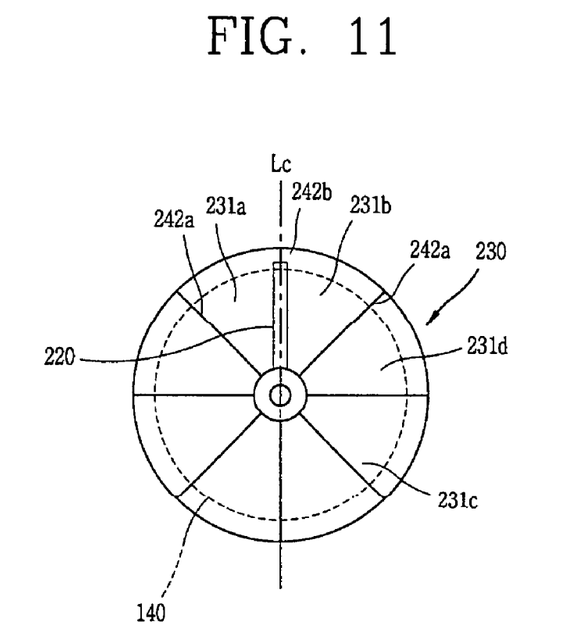
FIG. 11 is a back view of FIG. 10.

Referring to FIGS. 10 and 11, when the push member 220 is positioned between the first inclined surface 231a and the second inclined surface 231b, the push surface 222 of the push member 220 is not in contact with the first inclined surface 231a nor the second inclined surface 231b. Therefore, the camera module 140 is considered to be positioned on the center line (Lc) of the camera rotating plate 230.

Figure 12:
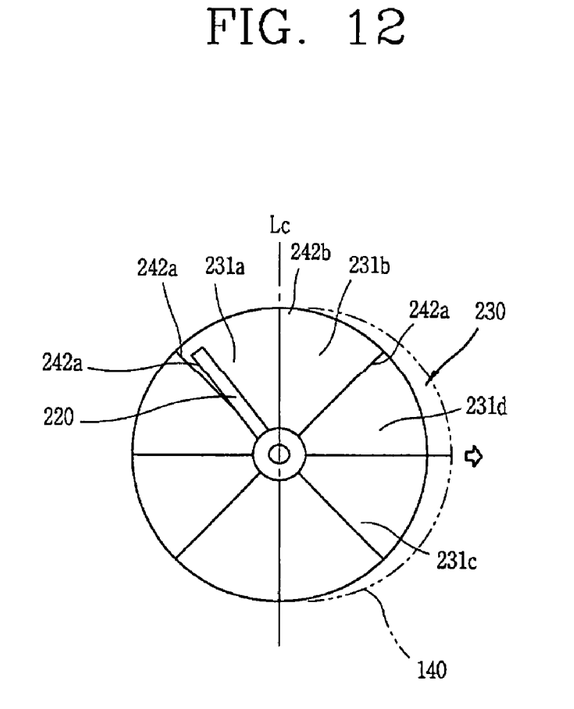
FIG. 12 is a back view of FIG. 10 describing an operation for controlling an angle of a camera module in a rightward direction.

As shown in FIG. 12, a user pressing a rightward direction button (not shown) on the main body 110 causes the rotation shaft 211 of the step motor 210 to rotate counterclockwise, for example. This in turn drives the push member 220, fixed to the rotation shaft 211, to rotate counterclockwise as well. While moving counterclockwise, the push surface 222 of the push member 220 contacts the first inclined surface 231a of the camera rotating plate 230. Upon contact, the push surface 222 pushes the first inclined surface 231a so that the rotating plate 230 rotates rightwardly, centering on the projection 242, to thereby rotate the camera module 140 rightwardly.

Figure 13:
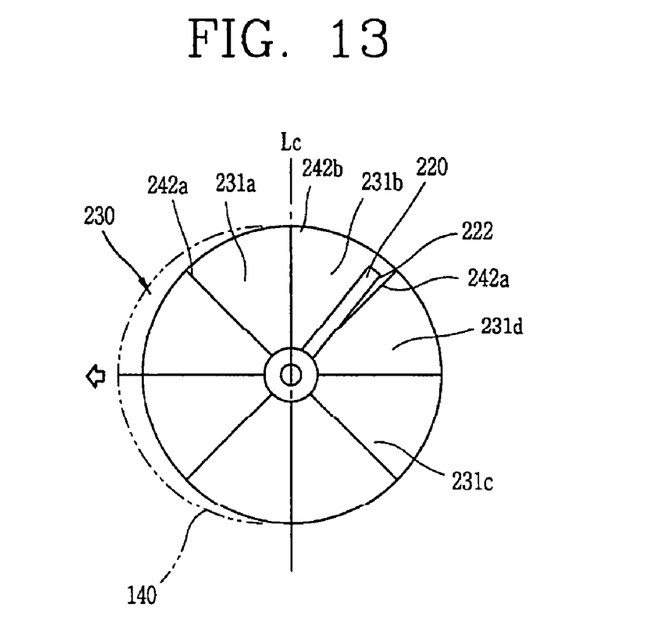
FIG. 13 is a back view of FIG. 10 describing an operation for controlling an angle of a camera module in a leftward direction.

On the contrary, as shown in FIG. 13, a user pressing a leftward direction button (not shown) on the main body 110 causes the rotation shaft 211 of the step motor 210 to rotate clockwise, for example. This in turn drives the push member 220, fixed to the rotation shaft 211, to rotate clockwise as well. While moving clockwise, the push surface 222 of the push member 220 contacts the second inclined surface 231b of the camera rotating plate 230. Upon contact, the push surface 222 pushes the second inclined surface 231b so that the rotating plate 230 rotates leftwardly, centering on the projection 242, to thereby rotate the camera module 140 leftwardly.

Figure 14:
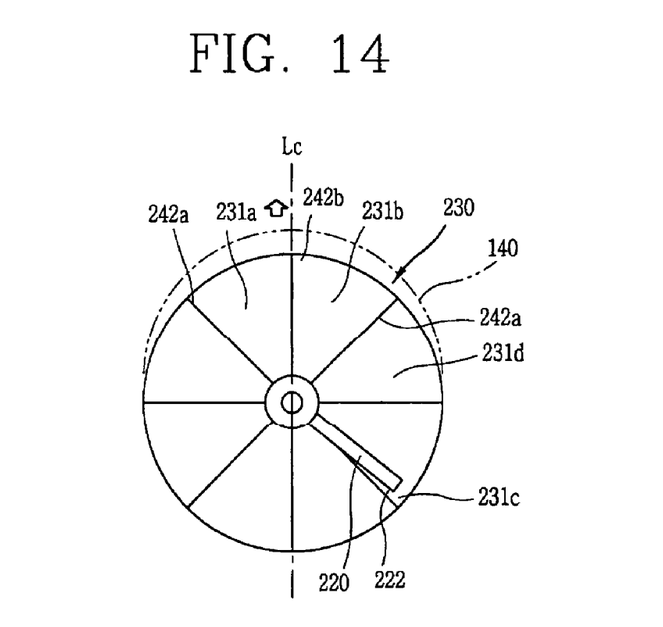
FIG. 14 is a back view of FIG. 10 describing an operation for controlling an angle of a camera module in an upward direction.

As shown in FIG. 14, a user pressing an upward direction button (not shown) installed on the main body 110 causes the rotation shaft 211 of the step motor 210 to rotate clockwise, for example. This in turn drives the push member 220, fixed to the rotation shaft 211, to also rotate clockwise. While moving clockwise, the push surface 222 of the push member 220 contacts the third inclined surface 231c of the camera rotating plate 230. Upon contact, the push surface 222 pushes the third inclined surface 231c so that the rotating plate 230 rotates upwardly, centering on the projection 242, to thereby rotate the camera module upwardly.

Figure 15:
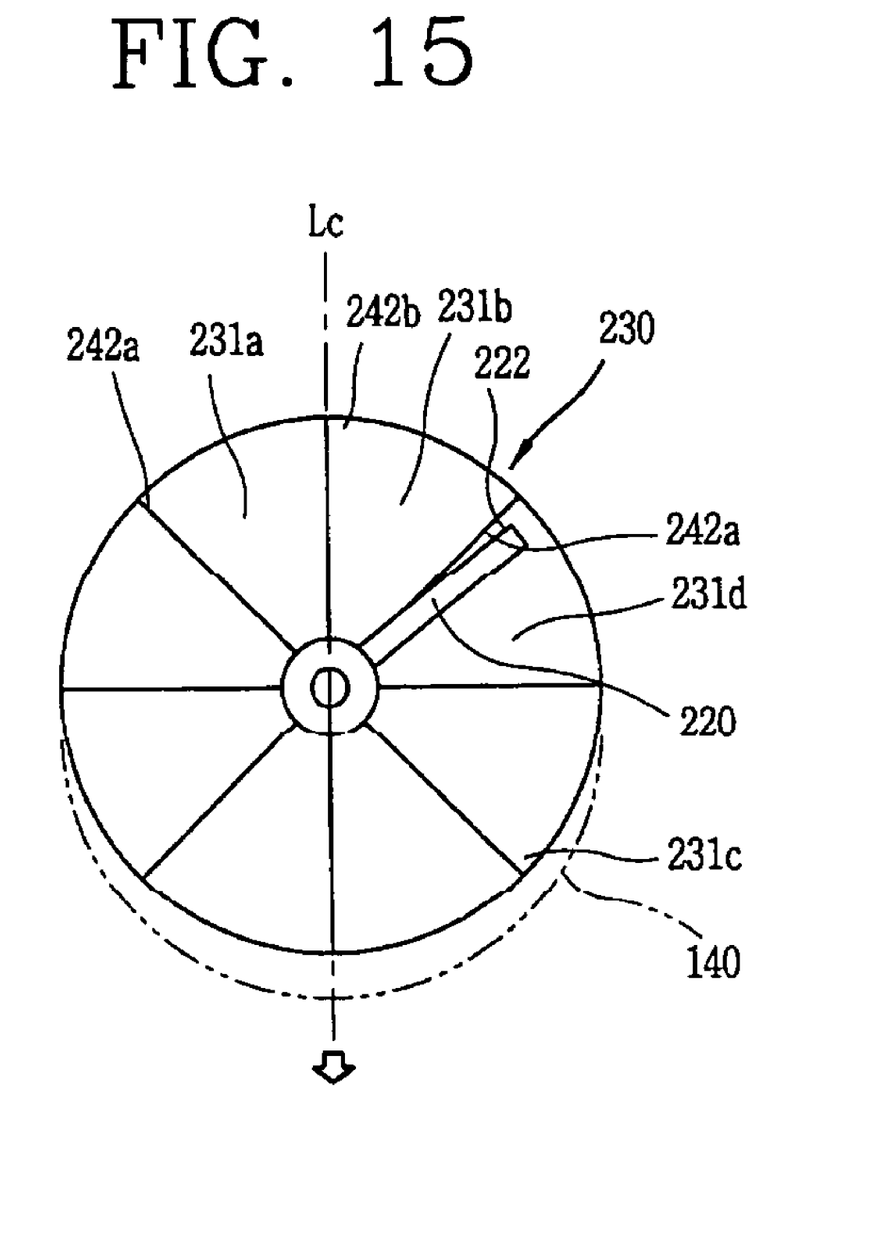
FIG. 15 is a back view of FIG. 10 describing an operation for controlling an angle of a camera module in a downward direction.

On the contrary, as shown in FIG. 15, a user pressing a downward direction button (not shown) on the main body 110 causes the rotation shaft 211 of the step motor 210 to rotate counterclockwise, for example. This in turn drives the push member 220, fixed to the rotation shaft 211, to also rotate counterclockwise. While moving counterclockwise, the push surface 222 of the push member 220 contacts the fourth inclined surface 231d of the camera rotating plate 230. Upon contact, the push surface 222 pushes the fourth inclined surface 231d so that the rotating plate 230 rotates downwardly, centering on the projection 242, to thereby rotate the camera module 140 downwardly.

As so far described, if a user manipulates an upward, downward, rightward and leftward direction key installed on a main body 110, a push member 220 fixed to a step motor 210 rotates at a regular angle, selectively pushing inclined surfaces 231a to 231d of a camera rotating plate 230. Because the surfaces are inclined on the basis of a projection 242, a rotation angle of a camera module 140 can be easily and conveniently controlled upwardly, downwardly, rightwardly and leftwardly. In other embodiments, the system of the invention may be implemented to control the rotation angle in various positions beyond that described herein. For example, the rotation angle may be adjusted toward a diagonal upward or downward direction.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for controlling a rotation angle of a camera module of a mobile communication device comprising:
   a driving force generating means having a rotation shaft;
   a push member rotatably coupled to the rotation shaft;
   a camera rotating plate configured for a camera module; and
   a pivot member for connecting the push member to the camera rotating plate and serving as a pivot for the camera rotating plate, wherein the pivot member is formed at a central portion of the camera rotating plate,
   wherein the driving force generating means drives the push member via the rotation shaft for selectively pushing the camera rotating plate to control a rotation angle of the camera module.

2. The apparatus of claim 1, wherein the pivot member comprises:
   a boss formed at a central portion of the camera rotating plate;
   a coupling cavity formed at a central portion of the boss; and
   a projection inserted in the coupling cavity and connected to the rotation shaft of the driving force generating means.

3. The apparatus of claim 2, wherein the boss is made of an elastic material so that the projection can be removably inserted in the coupling cavity.

4. The apparatus of claim 3, wherein a diameter of an entrance of the coupling cavity is smaller than a diameter of the projection.

5. The apparatus of claim 3, wherein a diameter of a central portion of the coupling cavity is greater than a diameter of the projection.

6. The apparatus of claim 2, wherein the projection is centrally positioned at point of rotation of the push member.

7. The apparatus of claim 1 wherein mountains and valleys are alternately formed in a circumferential direction at a surface of the camera rotating plate facing in the opposite direction of the camera module.

8. The apparatus of claim 7, wherein at least one inclined surface is formed between each mountain and valley.

9. The apparatus of claim 8, wherein two inclined surfaces are positioned to face into each other forming a valley in between.

10. The apparatus of claim 8, wherein the at least one inclined surface is selectively pushed by the push member to control the rotation angle of the camera module.

11. The apparatus of claim 9, wherein each inclined surface is formed at a 45-degree angle.

12. The apparatus of claim 2, wherein the projection and the push member are formed as one body.

13. The apparatus of claim 1, wherein the mobile communication device comprises:
a main body;
a folder rotatably fixed to a side of the main body by a hinge portion; and
a camera mounting cavity formed at an upper surface of the folder for housing the camera module.

14. The apparatus of claim 13, wherein the driving force generating means is electrically connected to a main printed circuit board of the main body through a flexible printed circuit board.

15. The apparatus of claim 13, wherein a user-manipulated direction button is installed on the main body for the user to control the apparatus.

16. The apparatus of claim 15, wherein pressing the user-manipulated direction button causes movement of the rotation shaft of the driving force generating means to cause movement of the push member to cause movement of an inclined surface of the camera rotating plate to thereby control the rotation angle of the camera module.

17. An apparatus for controlling a rotation angle of a camera module of a mobile communication device comprising:
a main body;
a camera module;
a camera mounting cavity formed at the main body for housing the camera module;
a driving force generating means having a rotation shaft;
a push member rotatably coupled to the rotation shaft;
a camera rotating plate fixed to the camera module; and
a pivot member for connecting the push member to the camera rotating plate and serving as a pivot for the camera rotating plate, wherein the pivot member is formed at a central portion of the camera rotating plate,
the driving force generating means driving the push member via the rotation shaft for selectively pushing the camera rotating plate to control a rotation angle of the camera module.

18. The apparatus of claim 17, wherein mountains and valleys are alternately formed in a circumferential direction at a surface of the camera rotating plate.

19. The apparatus of claim 18, wherein at least one inclined surface is formed between each mountain and valley.

20. The apparatus of claim 19, wherein the at least one inclined surface is selectively pushed by the push member to control the rotation angle of the camera module.

21. The apparatus of claim 1, wherein the rotation angle of the camera module comprises upward, downward, rightward, leftward, diagonal upward, and diagonal downward directions.

22. An apparatus for controlling a rotation angle of a camera module of a mobile communication device comprising:
a driving force generating means having a rotation shaft;
a push member rotatably coupled to the rotation shaft;
a camera rotating plate configured for a camera module; and
a pivot member for connecting the push member to the camera rotating plate and serving as a pivot for the camera rotating plate, wherein the pivot member is formed at a central portion of the camera rotating plate,
wherein the driving force generating means, the push member, the camera rotating plate, and the pivot member are coupled to the rotation shaft of the driving force generating means.

* * * * *